(12) United States Patent
Zhou

(10) Patent No.: US 9,669,860 B2
(45) Date of Patent: Jun. 6, 2017

(54) STROLLER TRACK SYSTEM

(71) Applicant: Ming Zhou, Newport Coast, CA (US)

(72) Inventor: Ming Zhou, Newport Coast, CA (US)

( * ) Notice: Subject to any disclaimer, the term of this patent is extended or adjusted under 35 U.S.C. 154(b) by 0 days.

(21) Appl. No.: 15/144,782

(22) Filed: May 2, 2016

(65) Prior Publication Data
US 2016/0318538 A1 Nov. 3, 2016

Related U.S. Application Data

(60) Provisional application No. 62/155,358, filed on Apr. 30, 2015.

(51) Int. Cl.
*B62B 9/02* (2006.01)
*B62B 7/04* (2006.01)
*B62B 9/12* (2006.01)

(52) U.S. Cl.
CPC ............... *B62B 9/02* (2013.01); *B62B 7/048* (2013.01); *B62B 9/12* (2013.01); *B62B 2301/256* (2013.01)

(58) Field of Classification Search
CPC ........ B62B 9/02; B62B 9/12; B62B 2301/256
USPC ..... 180/9.22; 280/5.22, 650; 297/31, 32, 55, 297/56, 57; 474/140, 167, 190, 237, 260, 474/264, 273
See application file for complete search history.

(56) References Cited

U.S. PATENT DOCUMENTS

| | | | | |
|---|---|---|---|---|
| 3,231,290 A | * | 1/1966 | Weyer | A61G 5/061 280/5.22 |
| 3,529,688 A | * | 9/1970 | Bruce | A61G 5/061 180/6.7 |
| 4,044,850 A | * | 8/1977 | Winsor | A61G 5/045 180/9.26 |
| 4,473,234 A | * | 9/1984 | Egen | A61G 5/061 280/5.22 |
| 4,566,551 A | * | 1/1986 | Feliz | A61G 5/061 180/9.1 |
| 5,395,129 A | * | 3/1995 | Kao | A61G 5/061 180/8.2 |
| 6,648,343 B2 | * | 11/2003 | Way | A61G 5/061 280/250.1 |
| 7,347,426 B2 | * | 3/2008 | Negishi | A61G 5/061 180/8.2 |
| 2013/0207369 A1 | * | 8/2013 | Pollack | B62B 9/12 280/650 |

* cited by examiner

*Primary Examiner* — Jacob Knutson

(57) ABSTRACT

A stroller track system is used to facilitate the transporting of a stroller up and down stairs. The stroller track system includes a left tread assembly and a right tread assembly. The left tread assembly and the right tread assembly are used to engage multiple stairs while traversing a set of stairs. This allows the stroller to glide smoothly up or down the stairs. The left tread assembly and the right tread assembly each include a first track and a first stroller-attaching mount. The first track has a greater surface area than a normal wheel, allowing the first track to span a larger section of a staircase. The first stroller-attaching mount is used to attach the first track to a stroller. In alternative versions of the stroller track system, the left tread assembly and the right tread assembly may include additional tracks to further stabilize the stroller.

8 Claims, 12 Drawing Sheets

STROLLER TRACK SYSTEM

The current application claims a priority to the U.S. Provisional Patent application Ser. No. 62/155,358 filed on Apr. 30, 2015. The current application is filed on May 2, 2016 while Apr. 30, 2016 was on a weekend.

FIELD OF THE INVENTION

The present invention relates generally to track systems used to facilitate the moving of strollers up and down stairs. More specifically, the present invention is a stroller track system which may be attached to the underside of a stroller and used to engage multiple stairs in a staircase in order to move up and down stairs smoothly.

BACKGROUND OF THE INVENTION

Strollers have become essential for transporting young children or people with disabilities. There are a variety of stroller designs available today, however none solve the common challenge of going up and down stairs. Many individuals that have used a stroller will say that going up and down stairs is a challenging and inconvenient task. In most cases, an individual must carry the stroller up and down stairs, typically requiring the help of another person. Alternatively, the user may lift the stroller one stair at a time in order to traverse a set of stairs. Both approaches can be tiring and cumbersome.

Accordingly, the present invention aims to solve the problem of transporting strollers up and down stairs. The present invention is a stroller track system that can be attached or connected to the underside of a stroller. The stroller track system uses a left tread assembly and a right tread assembly which both remain in a folded configuration under the stroller during normal use. When a user needs to traverse up or down a set of stairs, the user may unfold the left tread assembly and the right tread assembly manually, or at the push of a button. By moving the left tread assembly and the right tread assembly into an unfolded configuration, the left tread assembly and the right tread assembly may be engaged with multiple stairs, allowing the stroller to easily glide up or down the staircase.

DETAILED DESCRIPTION OF THE INVENTION

Figure 1:
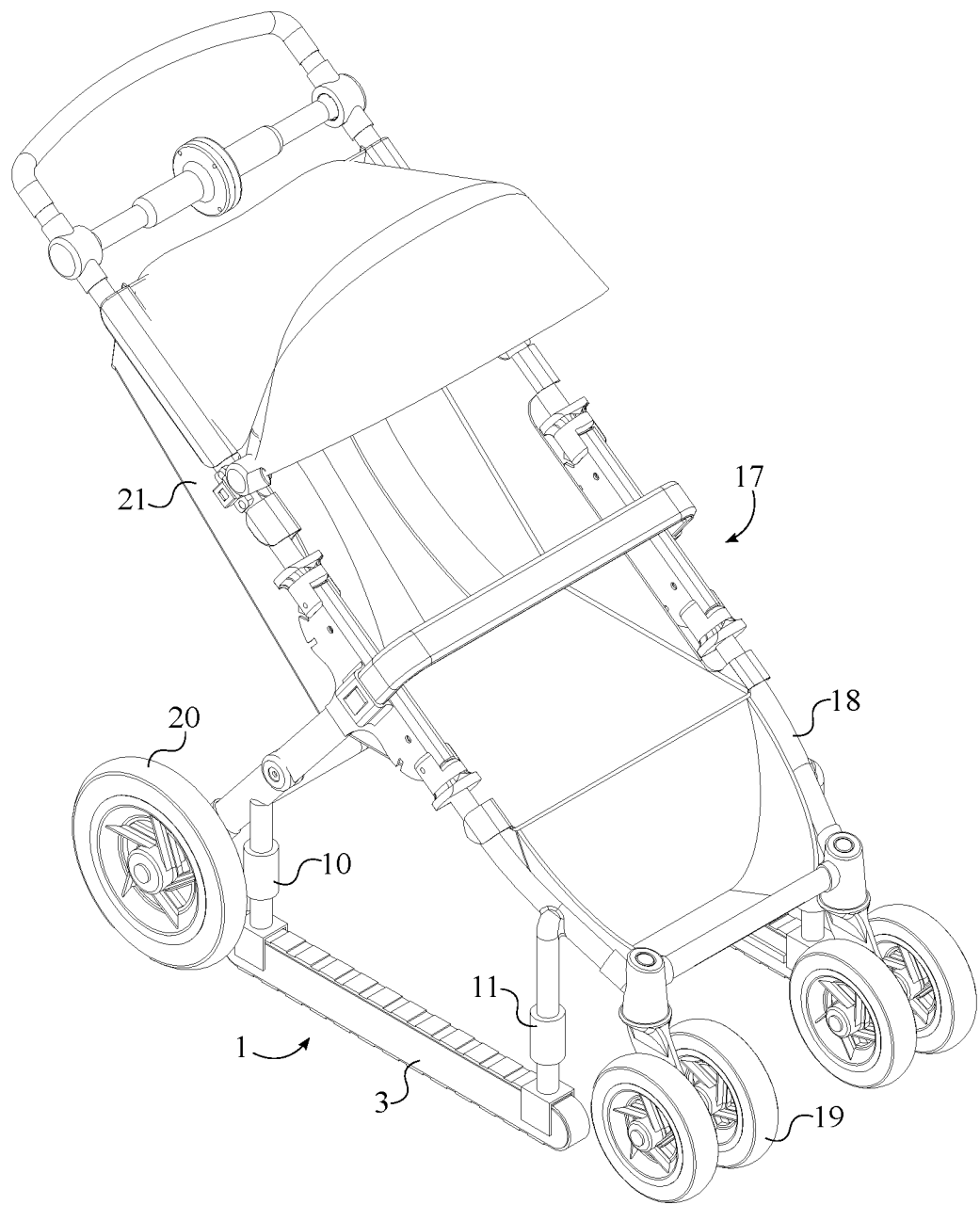
FIG. 1 is a front left perspective view of a first embodiment of the present invention, wherein the first track is connected to the first stroller-attaching mount and the second stroller-attaching mount in the first embodiment.

All illustrations of the drawings are for the purpose of describing selected versions of the present invention and are not intended to limit the scope of the present invention.

With reference to FIGS. 1-2, and FIGS. 3A-3B, the present invention is a stroller track system which is used to assist a user in navigating a stroller 17 up and down stairs. The present invention comprises a left tread assembly 1 and a right tread assembly 2. The left tread assembly 1 and the right tread assembly 2 are used to provide a continuous contact surface for a stroller 17, distributing the weight of the stroller 17 across the edges of multiple stairs in a staircase. This allows the user to push the stroller 17 up the stairs instead of lifting the stroller 17 up and over each step. The left tread assembly 1 and the right tread assembly 2 each comprise a first track 3 and a first stroller-attaching mount 10. The first track 3 forms a continuous band which may be lowered to engage multiple stairs at a time. By engaging multiple stairs at a time, the first track allows the stroller to move smoothly up or down a set of stairs. The first track 3 comprises a belt 4, a proximal wheel 5, a distal wheel 6, and a wheel mounting bracket 7. The wheel mounting bracket 7 is used to stabilize the proximal wheel 5 and the distal wheel 6. The proximal wheel 5 and the distal wheel 6 are rotatably connected to the wheel mounting bracket 7. The proximal wheel 5 and the distal wheel 6 are positioned opposite to each other along the wheel mounting bracket 7. This arrangement allows the belt 4 to be perimetrically positioned about the proximal wheel 5, the wheel mounting bracket 7, and the distal wheel 6. This creates a continuous surface upon which the stroller 17 can roll. The first stroller-attaching mount 10 is bistably connected to the first track 3 and is used to mount the first track 3 to the stroller 17. This allows the first track to be engaged or disengaged with the floor or a set of stairs.

Figure 3A:
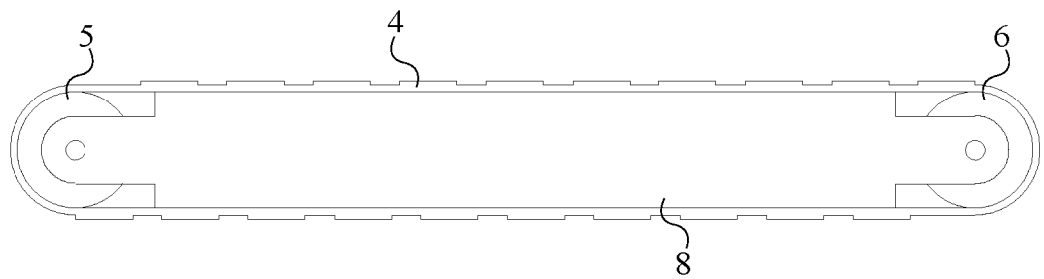
FIG. 3A is a schematic view showing a preferred embodiment of the first track.

In the preferred embodiment of the first track 3, shown in FIG. 3A, the wheel mounting bracket 7 is a platform 8. The platform 8 helps to support the belt 4 and prevents the belt 4 from flexing or deforming excessively during use. The belt 4 is slidably engaged with the platform 8 so that the belt 4 is free to rotate about the proximal wheel 5, the platform 8, and the distal wheel 6. The preferred embodiment of the first track 3 may also be used for additional tracks.

Figure 3B:
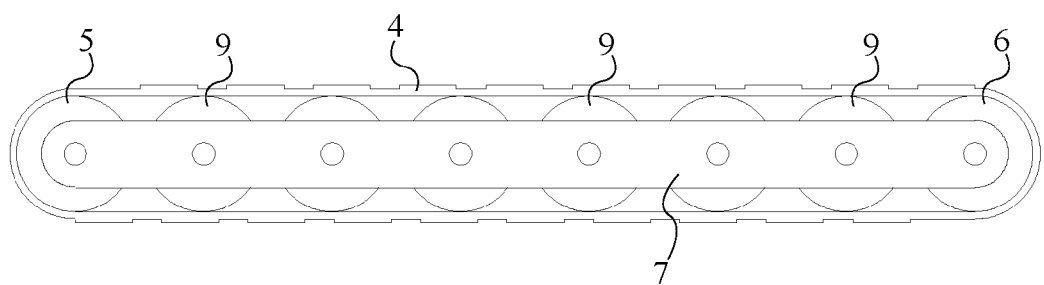
FIG. 3B is a schematic view showing an alternative embodiment of the first track.

In an alternative embodiment of the first track 3, shown in FIG. 3B, the first track 3 further comprises at least one intermediate wheel 9. The at least one intermediate wheel 9 is rotatably connected to the wheel mounting bracket 7 and is linearly distributed between the proximal wheel 5 and the distal wheel 6. In this embodiment, the belt 4 is tangentially positioned about the at least one intermediate wheel 9 so that the proximal wheel 5, the distal wheel 6, and the at least one intermediate wheel 9 may all be used to support the belt 4. This ensures that the belt 4 create an even surface for rolling up and down stairs.

Figure 2:
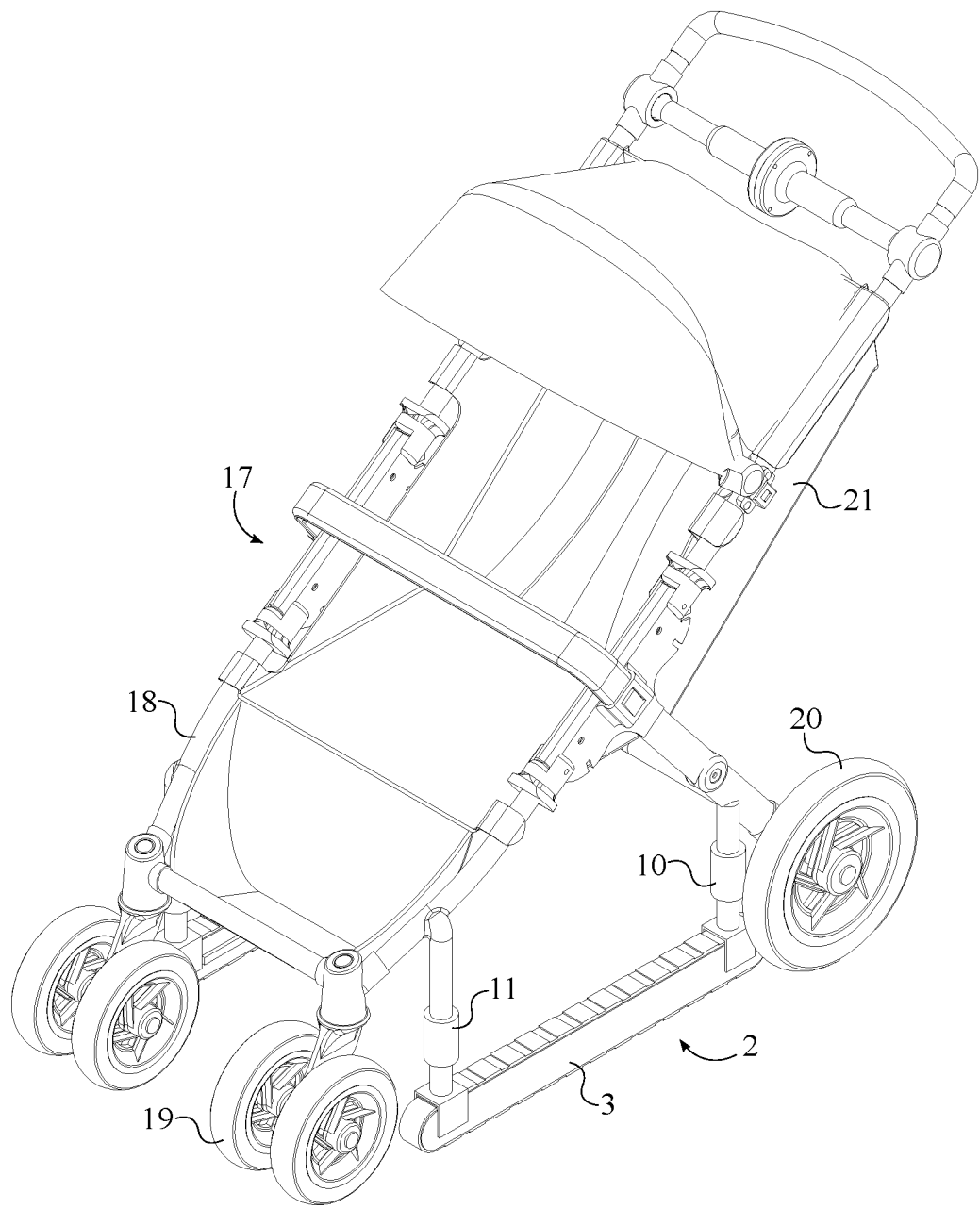
FIG. 2 is a front right perspective view of the first embodiment of the present invention.

In a first embodiment of the present invention, shown in FIGS. 1-2, the left tread assembly 1 and the right tread assembly 2 each further comprise a second stroller-attaching mount 11. The second stroller-attaching mount 11 is designed to give added support to the first track 3. The first stroller-attaching mount 10 is terminally positioned along the first track 3. The second stroller-attaching mount 11 is connected adjacent to the first track 3, opposite to the first stroller-attaching mount 10. It is preferred that, the first stroller-attaching mount 10 and the second stroller-attaching mount 11 are height-adjustable pistons which may be used to move the first track 3 towards or away from the floor or the stairs upon which the stroller 17 is rolling.

The present invention further comprises a stroller 17 which comprises a frame 18, a front wheel assembly 19, and a rear wheel assembly 20. Similar to a typical stroller, the front wheel assembly 19 and the rear wheel assembly 20 allow the stroller 17 to roll across relatively flat surfaces. The front wheel assembly 19 is mounted to the frame 18, and the rear wheel assembly 20 is mounted to the frame 18, opposite to the front wheel assembly 19. The left tread assembly 1 and the right tread assembly 2 are mounted opposite to each other across the frame 18 to equally distribute the weight of the stroller 17. The first stroller-attaching mount 10 is connected to the frame 18, adjacent to the rear wheel assembly 20. The second stroller-attaching mount 11 is connected to the frame 18, adjacent to the front wheel assembly 19. As mentioned, in the first embodiment of the present invention, the first stroller-attaching mount 10 and the second stroller-attaching mount 11 are height adjusting pistons. This allows the first stroller-attaching mount 10 and the second stroller-attaching mount 11 to lift the frame 18 by pushing the first track 3 towards the ground or stairs. When folding the stroller 17 for storage or transportation, the stroller-attaching mount 11 can be detached from the frame 18 to allow frame 18 to collapse into a compact space saving configuration.

Figure 4:
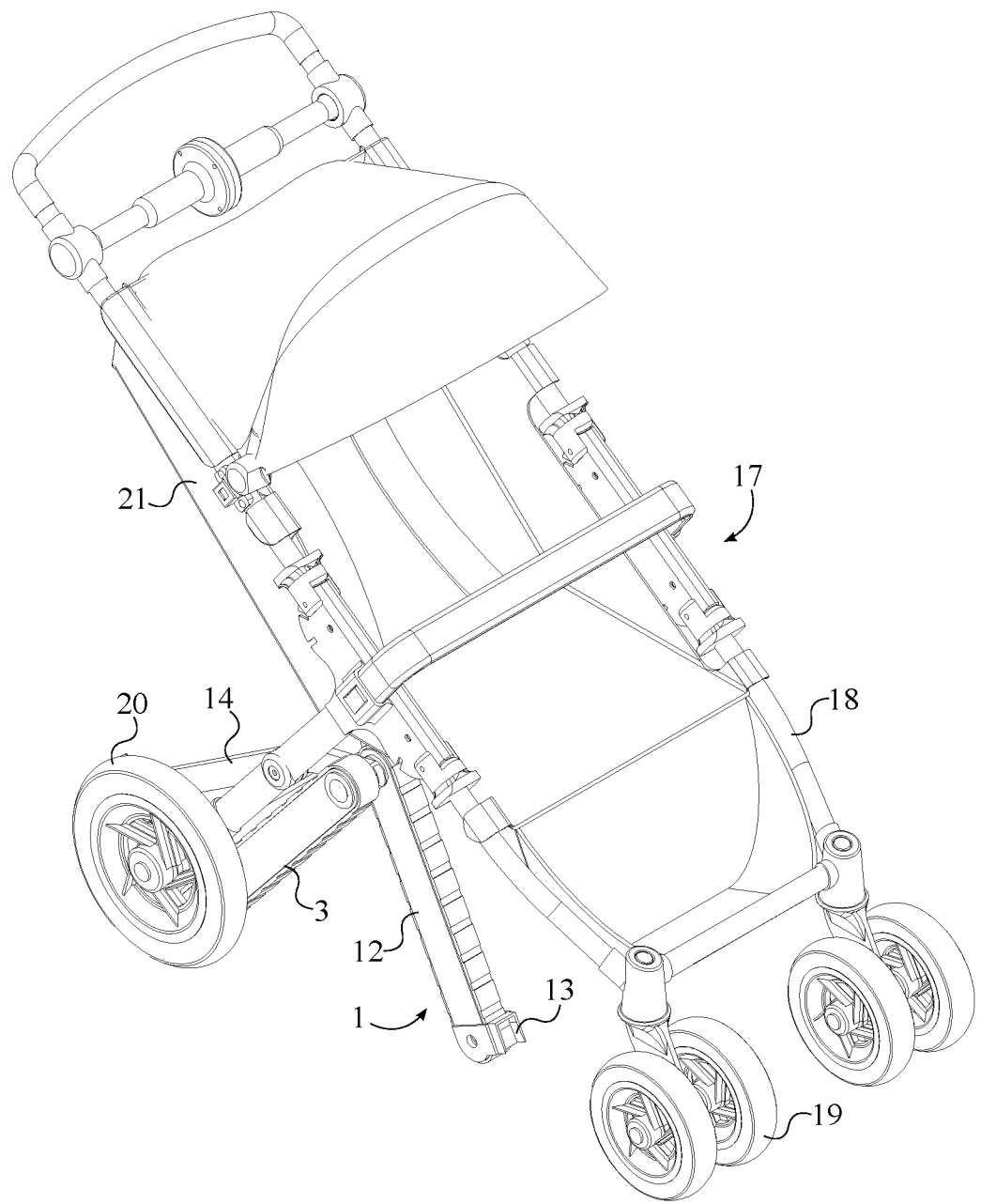
FIG. 4 is a front left perspective view of a second embodiment of the present invention in the folded configuration, wherein the second embodiment comprises the second track and the track-securing bracket, and wherein the track-securing bracket is free to move.
Figure 5:
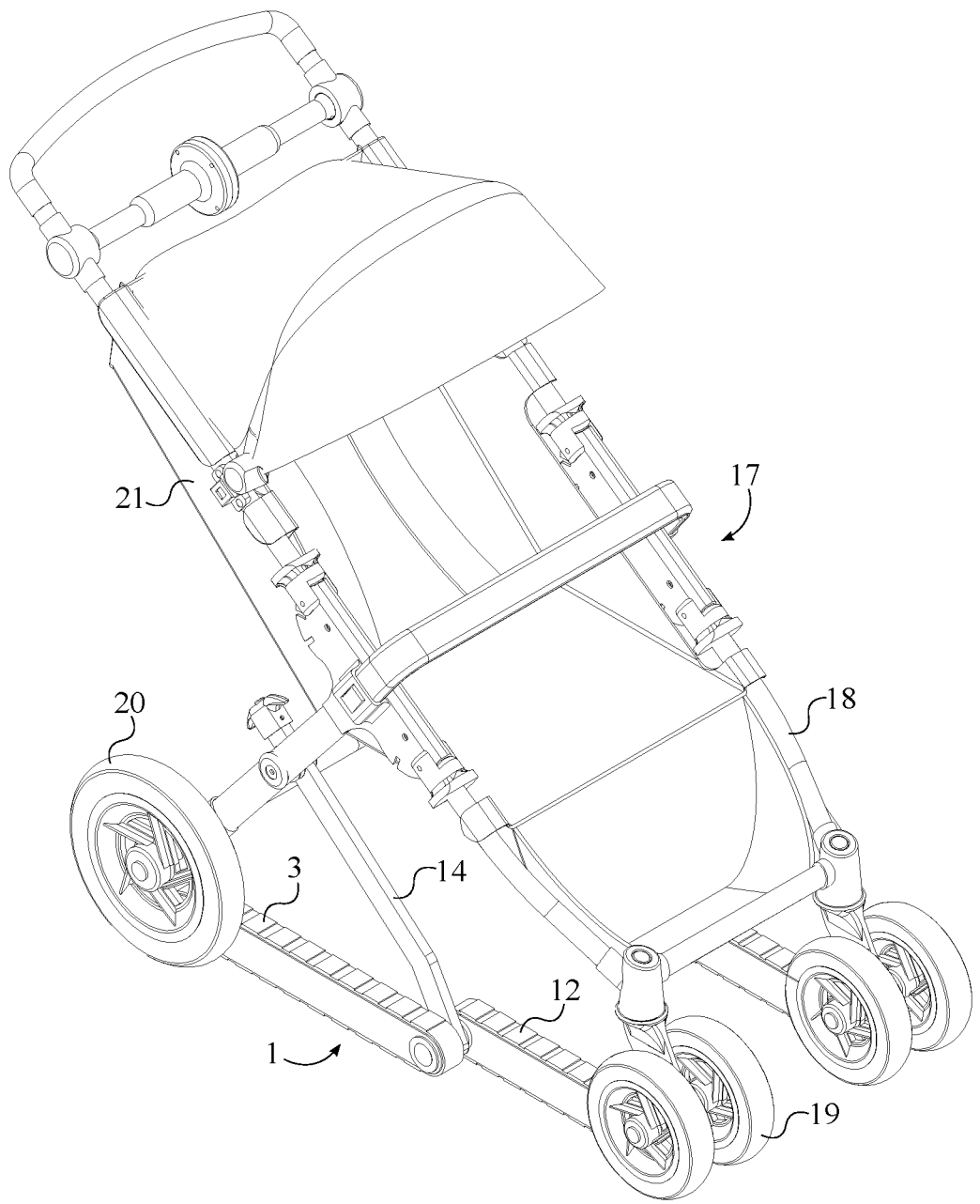
FIG. 5 is a front left perspective view of the second embodiment of the present invention in an unfolded configuration, wherein track securing bracket is attached to the front wheel assembly in the unfolded configuration.
Figure 6:
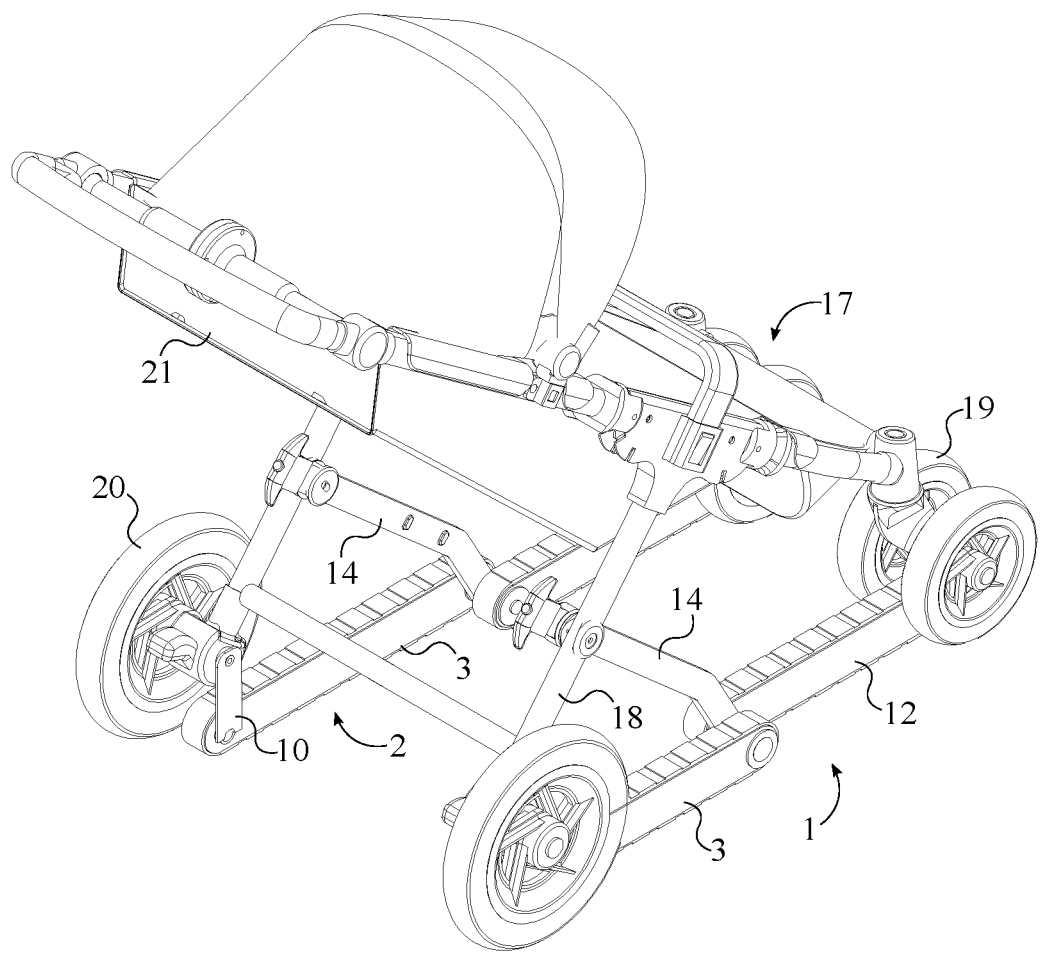
FIG. 6 is a rear left perspective view of the second embodiment of the present invention in the unfolded configuration.

In a second, and preferred, embodiment, of the present invention, the left tread assembly 1 and the right tread assembly 2 each further comprise a second track 12 and a track-securing bracket 13. In reference to FIGS. 4-6, the second track 12 is used to further increase the effective contact surface length of the stroller 17, beyond what is capable using only the first track 3. Combined, the first track 3 and the second track 12 are used to span the length of at least three stair edges. This ensures that when the user is pushing the stroller 17 up a set of stairs, a minimum of two stairs are engaged at any given time. The first track 3 is pivotally mounted to the first stroller-attaching mount 10. The first stroller-attaching mount 10 is pivotally connected to the frame 18, adjacent to the rear wheel assembly 20. This arrangement allows the first track 3 to be pivoted until the first track 3 is engaged with the ground or a set of stairs. The second track 12 is pivotally connected to the first track 3, opposite to the stroller-attaching mount. This allows the second track 12 to pivot between a folded configuration and an unfolded configuration. By unfolding the second track 12, the first track 3 and the second track 12 may be simultaneously engaged with the ground or a set of stairs. The track-securing bracket 13 is connected to the second track 12, opposite to the first track 3. The track-securing bracket 13 is used to stabilize the second track 12. To do this, the track-securing bracket 13 is removably attached to the front wheel assembly 19.

Also in the second embodiment of the present invention, the left tread assembly 1 and the right tread assembly 2 each comprise a track adjustment lever 14. The track adjustment lever 14 provides leverage for the user to fold and unfold the first track 3 and the second track 12. The track adjustment lever 14 is pivotally connected to the first track 3 and the second track 12. The track adjustment lever 14 is also slidably and pivotally engaged with the frame 18. This arrangement allows the user to push and rotate the track adjustment lever 14 to simultaneously unfold the first track 3 and the second track 12 until both are engaged with the ground or stairs. Alternatively, the left tread assembly 1 and the right tread assembly 2 may be motorized to transition in-between the folded configuration and the unfolded configuration. To do so, a track-engaging motor may be mechanically integrated into the pivotal connection between the first track 3 and the second track 12. Though this represents the preferred method, additional components may be mechanically integrated into the left tread assembly 1 and the right tread assembly 2. As a result, user exertion is minimized during the process of transitioning the left tread assembly 1 and the right tread assembly 2 between the folded configuration and the unfolded configuration. Further, the left tread assembly 1 and the right tread assembly 2 may be motorized to propel the stroller 17. By motorizing the left tread assembly 1 and the right tread assembly 2 in this way, the user may be aided in pushing the stroller 17 up a set of stairs. To motorize the left tread assembly 1 and the right tread assembly 2 for the purpose of propulsion, at least one propulsion motor is mechanically integrated into the first track 3. The propulsion motor may either be engaged with the proximal wheel 5 or the distal wheel 6. Alternatively, the at least one propulsion motor may be mechanically integrated into the second track 12.

Figure 9:
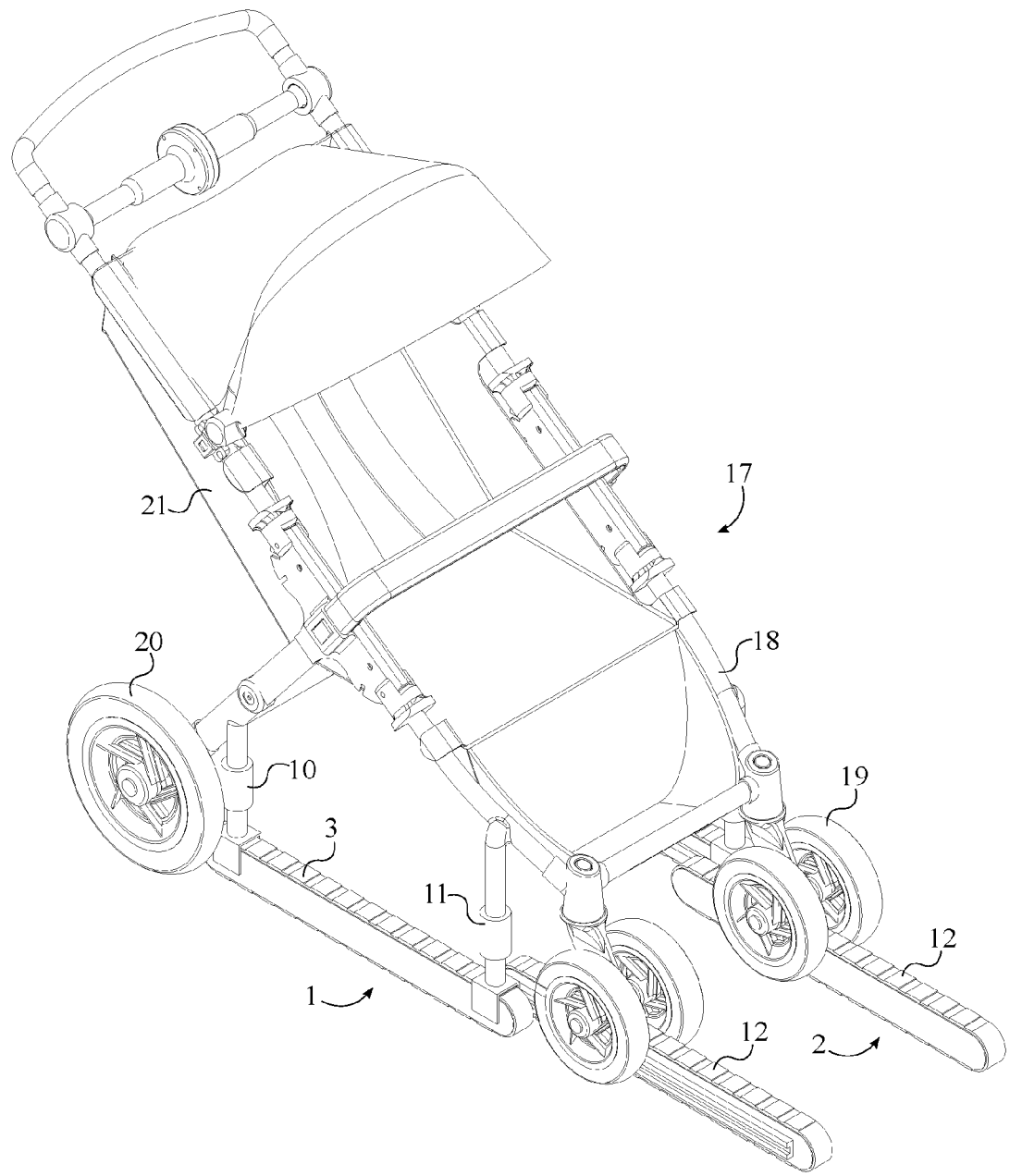
FIG. 9 is a front left perspective view of a third embodiment of the present invention, wherein the second track is slidably engaged with the first track in the third embodiment.

In a third embodiment of the present invention, shown in FIG. 9, the left tread assembly 1 and the right tread assembly 2 each further comprise a second track 12 and a second stroller-attaching mount 11. The second track 12 is used to further increase the effective surface length of the stroller 17, beyond what is capable using only the first track 3. The first stroller-attaching mount 10 is terminally positioned along the first track 3. The second stroller-attaching mount 11 is connected adjacent to the first track 3, offset from the first stroller-attaching mount 10. Similar to the preferred embodiment of the present invention, the first stroller-attaching mount 10 and the second stroller-attaching mount 11 are height-adjustable pistons. The first stroller-attaching mount 10 and the second stroller-attaching mount 11 are used to move the first track 3 towards or away from the floor or the stairs upon which the stroller 17 is rolling. The first stroller-attaching mount 10 is connected to the frame 18, adjacent to the rear wheel assembly 20. The second stroller-attaching mount 11 is connected to the frame 18, adjacent to the front wheel assembly 19. By offsetting the first stroller-attaching mount 10 and the second stroller-attaching mount 11, the weight of the stroller 17 may be equally distributed. The third embodiment differs from the preferred embodiment because the second track 12 is slidably engaged with the first track 3. This allows the second track 12 to extend outward from the first track 3 so that more stairs may be engaged at a time. This increases the stability of the stroller 17 when rolling on stairs.

In a fourth embodiment of the present invention and a fifth embodiment of the present invention, the left tread assembly 1 and the right tread assembly 2 each further comprise a second track 12, a second stroller-attaching mount 11, and a height adjustment bracket 15. In reference to FIGS. 10-11, the height adjustment bracket 15 is used to stabilize the connection between the first track 3 and the second track 12. In both the fourth embodiment of the present invention and the fifth embodiment of the present invention, the first stroller-attaching mount 10 is pivotally connected to the first track 3, and the second stroller-attaching mount 11 is bistably connected to the second track 12. This arrangement allows the second track 12 to be moved towards or away from the floor or the stairs in which the user wishes to traverse. The first stroller-attaching mount 10 and the second stroller-attaching mount 11 are used to stabilize the first track 3 and the second track 12. The second track 12 is pivotally connected to the first track 3, opposite to the first stroller-attaching mount 10. This allows the second track 12 to be pivoted between the folded and the unfolded configuration. The first track 3 is slidably and rotatably engaged with the height adjustment bracket 15, opposite to the first stroller-attaching mount 10. This helps to guide the first track 3 and the second track 12 in between the folded configuration and unfolded configuration. Further, the connection between the first track 3 and the height adjustment bracket 15 helps to stabilize both the first track 3 and the second track 12 in the unfolded configuration.

Figure 10:
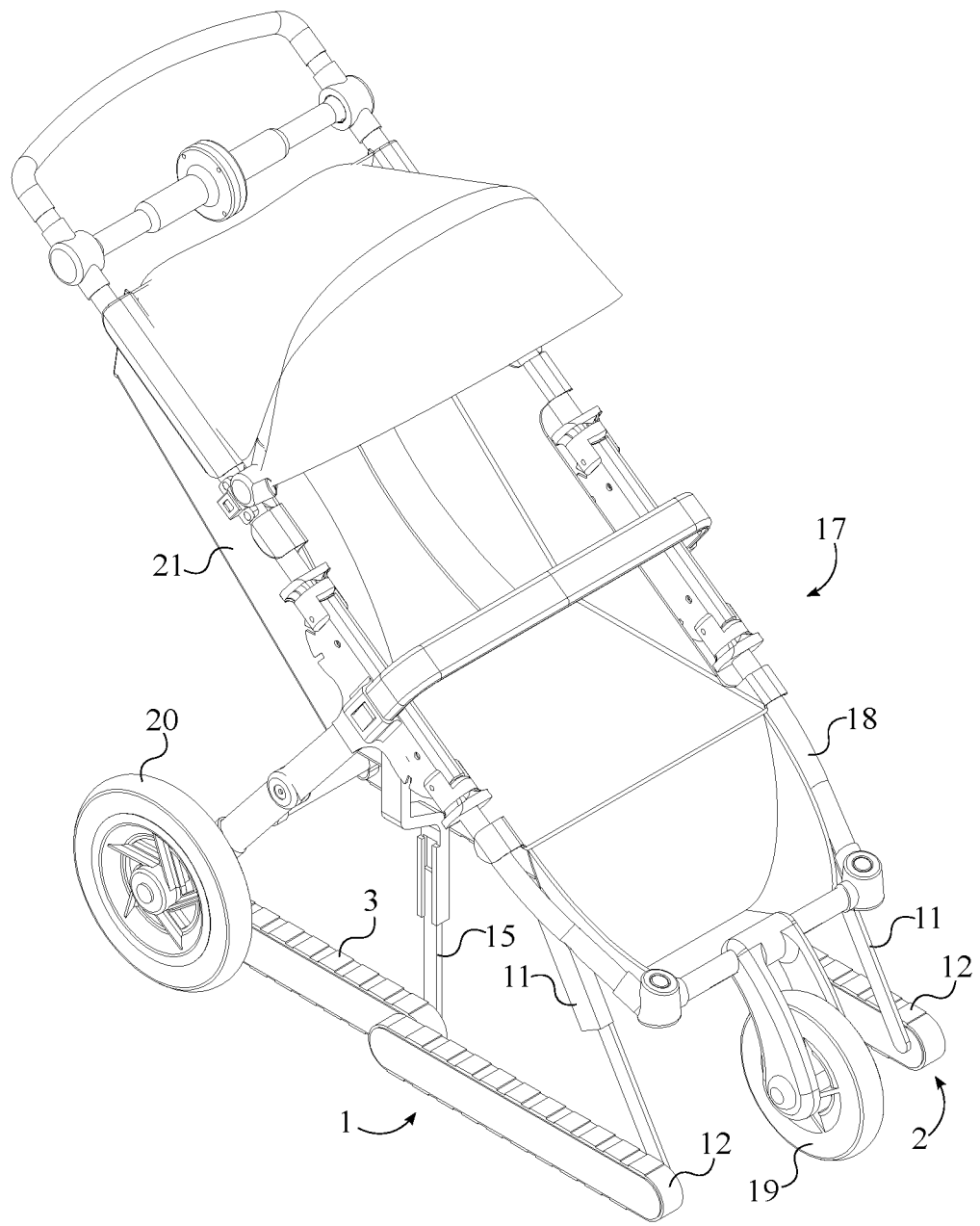
FIG. 10 is a front left perspective view of a fourth embodiment of the present invention, wherein the first track is pivotally connected to the first stroller-attaching mount and the second track is slidably engaged with the second stroller-attaching mount in the fourth embodiment.

In the fourth embodiment of the present invention, shown in FIG. 10, the first stroller-attaching mount 10 is pivotally connected to the frame 18, adjacent to the rear wheel assembly 20. The second stroller-attaching mount 11 is slidably engaged to the frame 18, adjacent to the front wheel assembly 19. This arrangement provides a simple means of transitioning the first track 3 and the second track 12 in between the folded configuration and the unfolded configuration. The height adjustment bracket 15 is mounted to the frame 18, in between the front wheel assembly 19 and the rear wheel assembly 20. This arrangement also helps to evenly distribute the weight of the stroller 17 onto the first track 3 and the second track 12.

Figure 11:
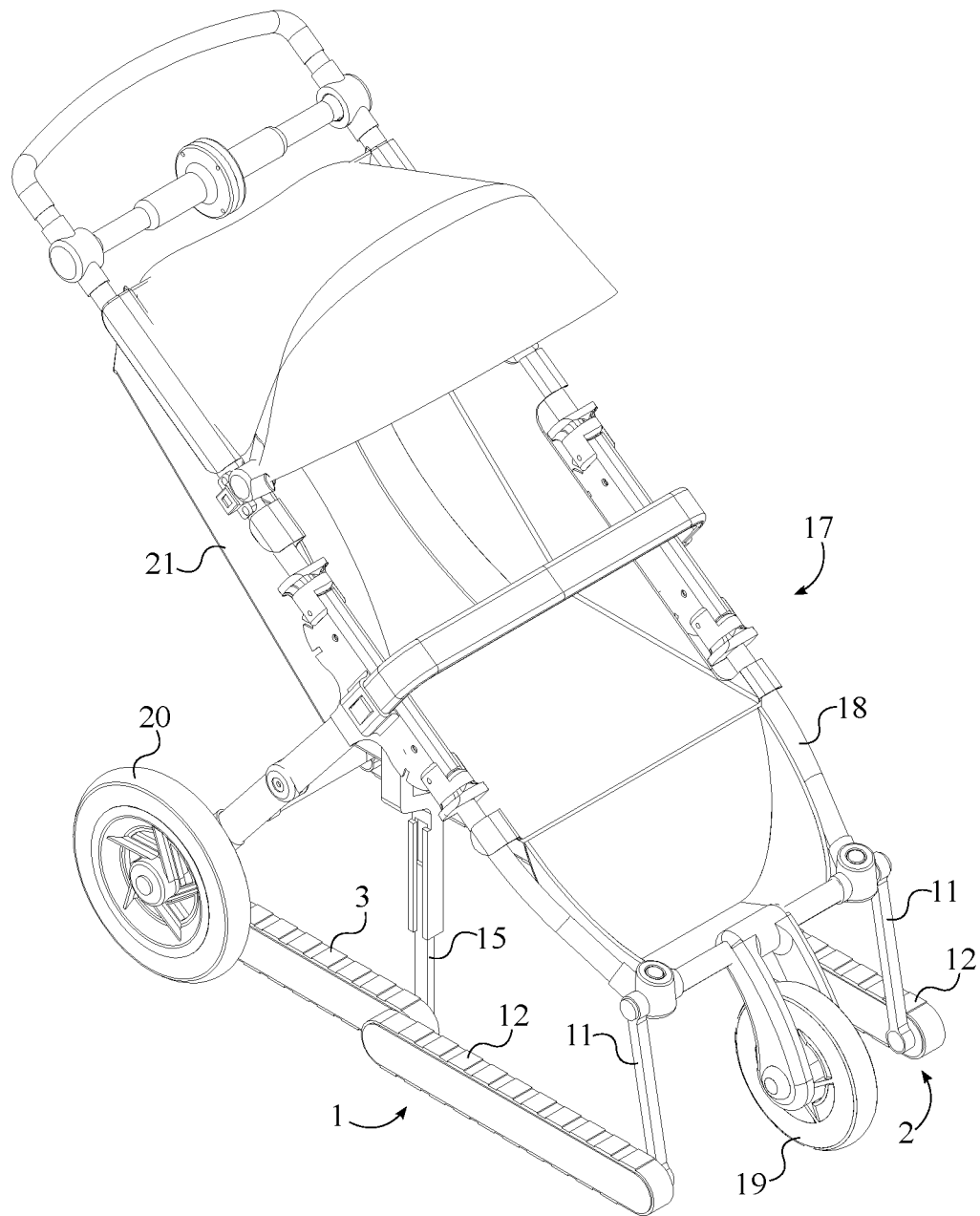
FIG. 11 is a front left perspective view of a fifth embodiment of the present invention, wherein the first track is pivotally connected to the first stroller-attaching mount and the second track is pivotally connected to the second stroller-attaching mount in the fifth embodiment.

In the fifth embodiment of the present invention, shown in FIG. 11, the first stroller-attaching mount 10 is pivotally connected to the frame 18, adjacent to the rear wheel assembly 20. Similarly, the second stroller-attaching mount 11 is pivotally engaged to the frame 18, adjacent to the front wheel assembly 19. This arrangement allows the first track 3 and the second track 12 to unfold symmetrically. This arrangement also allows the act of extending the stroller 17 to be used as a means of transitioning the first track 3 and the second track 12 into the unfolded configuration. Similar to the fourth embodiment of the present invention, the height adjustment bracket 15 is mounted to the frame 18, in between the front wheel assembly 19 and the rear wheel assembly 20. This arrangement equally helps to evenly distribute the weight of the stroller 17 onto the first track 3 and the second track 12.

Figure 7:
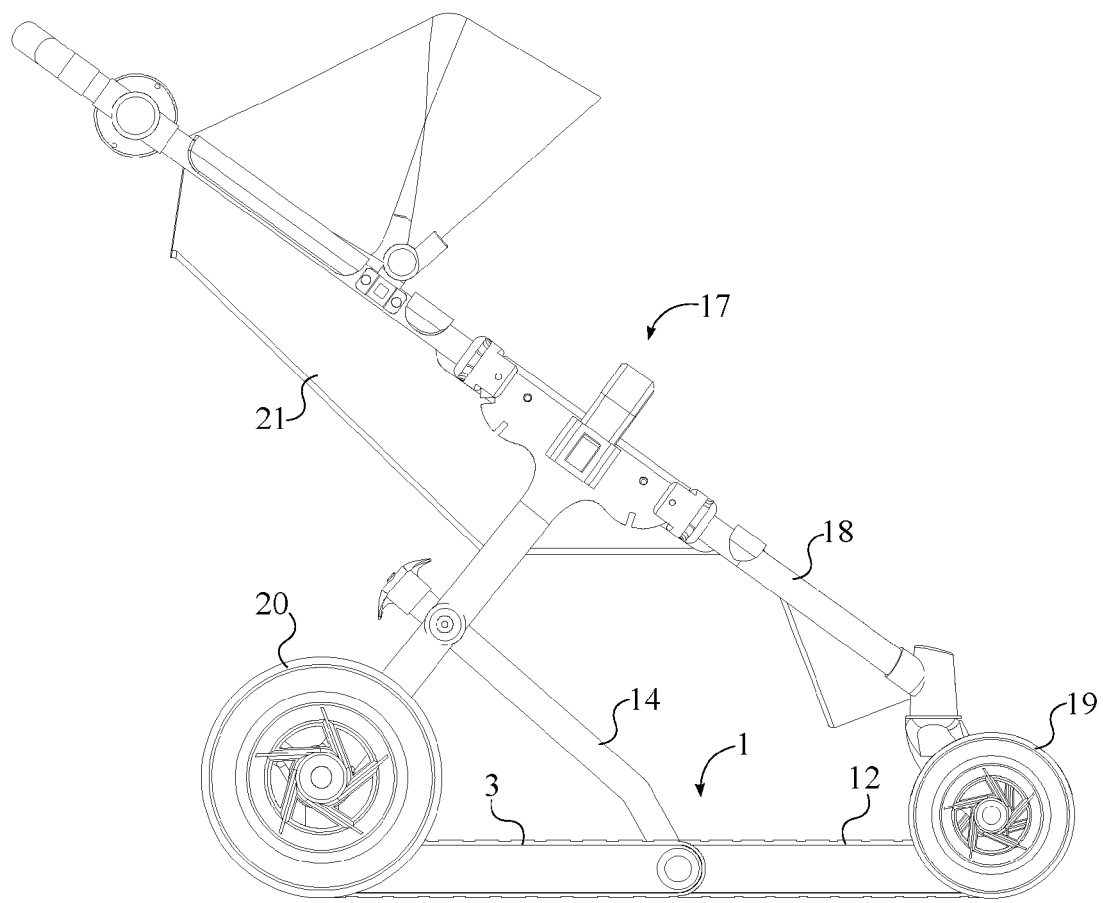
FIG. 7 is a left side view of the second embodiment of the present invention in the unfolded configuration.
Figure 8:
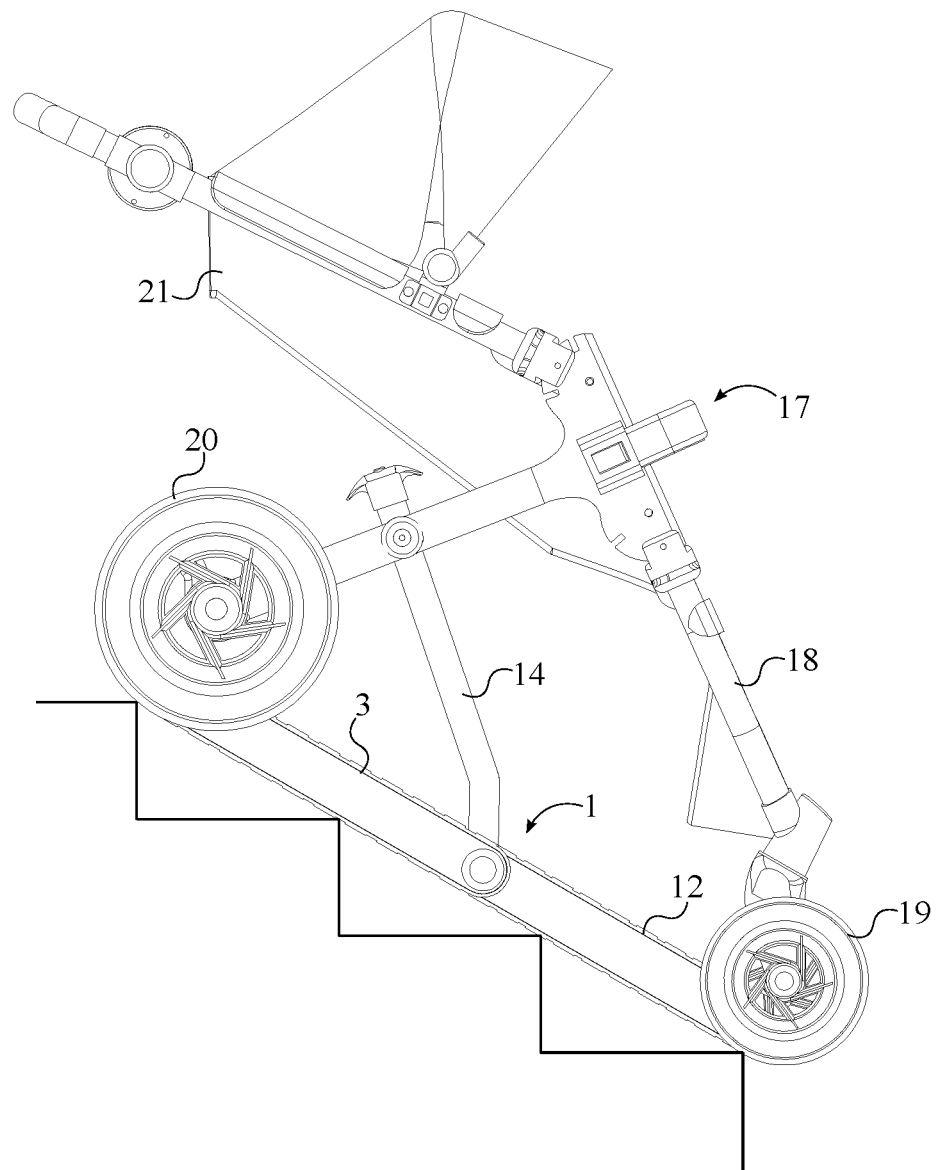
FIG. 8 is a left side view of the second embodiment of the present invention with the seat adjusted for traversing stairs.

In each embodiment of the present invention, the stroller 17 further comprises a seat 21. In reference to FIGS. 7-8, the seat 21 is used to hold one or more small children for transport. The seat 21 is adjustably mounted to the frame 18 so that the orientation of the seat 21 may be selectively configured to account for the orientation of the first tread assembly and the second tread assembly. This is done to ensure the comfort of the child or children held in the seat 21. Further, this arrangement helps to prevent children from falling out of the seat 21 while the stroller 17 is traversing down a set of stairs.

Figure 12:
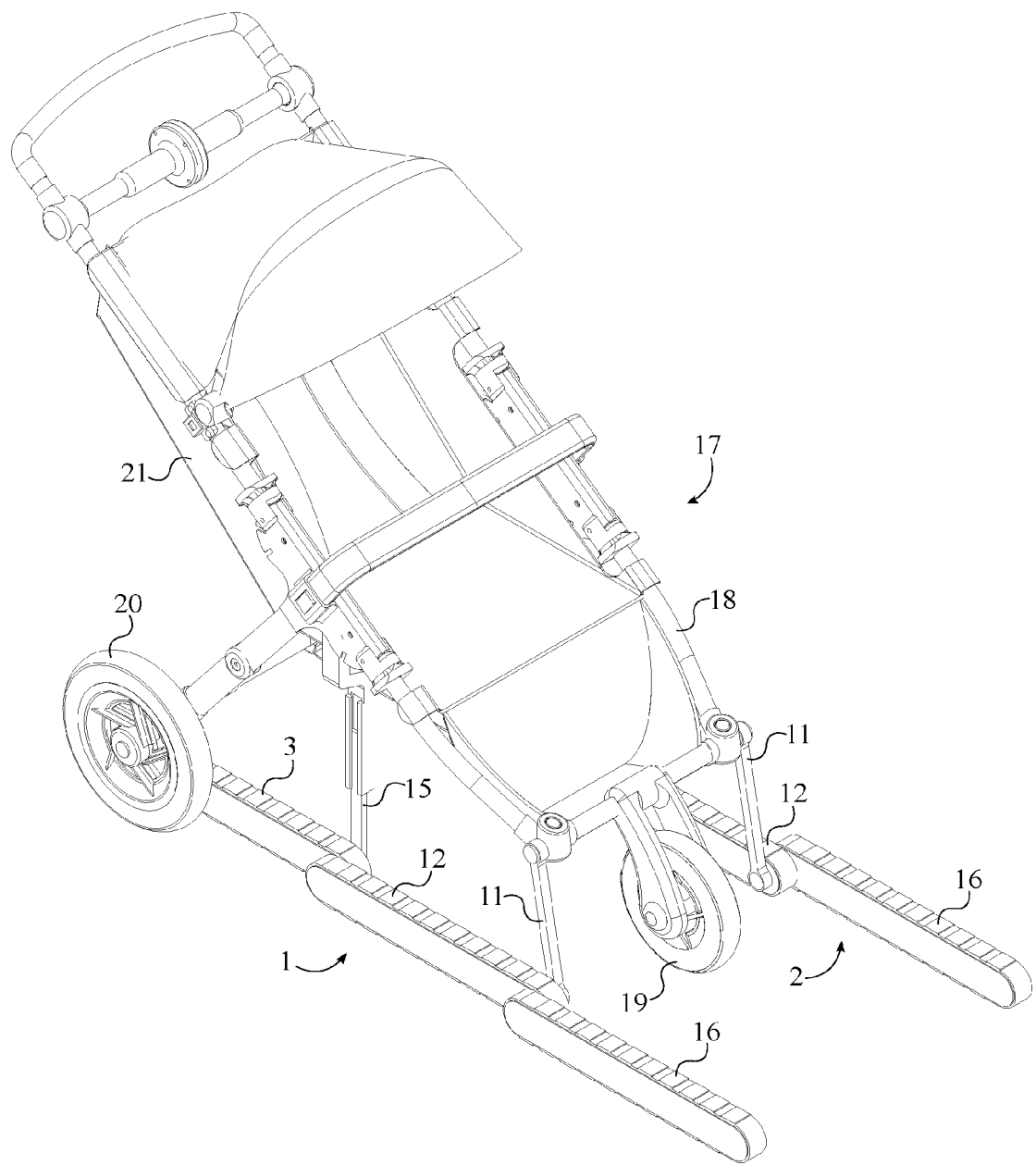
FIG. 12 is a front left perspective view of the fifth embodiment using a supplementary track.

Though the aforementioned embodiments have limited the left tread assembly 1 and the right tread assembly 2 to the first track 3 and, in some cases, the second track 12, it is to be noted that additional tracks may be added. In reference to FIG. 12, the left tread assembly 1 and the right tread assembly 2 may each comprise a second track 12 and at least one supplemental track 16. In this case, the second track 12 is pivotally connected to the first track 3. The at least one supplemental track 16 is pivotally connected to the second track 12, opposite to the first track 3. This allows each of the tracks to be positioned in the folded configuration. When moved into the unfolded configuration, the first track 3, the second track 12, and the at least one supplemental track 16 are aligned end-to-end. It is to be understood that any number of supplemental tracks 16 may be added.

Although the invention has been explained in relation to its preferred embodiments, it is to be understood that many other possible modifications and variations can be made without departing from the spirit and scope of the invention as hereinafter claimed.

What is claimed is:
1. A stroller track systems comprising:
a stroller;
a left tread assembly;
a right tread assembly;
the stroller comprising a frame, a front wheel assembly and a rear wheel assembly;
the front wheel assembly being connected to the frame;
the rear wheel assembly being connected to the frame, opposite to the front wheel assembly;
the left tread assembly and the right tread assembly each comprising a first track, a first stroller-attaching mount, a second track, a track-securing bracket and a track adjustment lever;
the first stroller-attaching mount being pivotally connected to the rear wheel assembly, opposite to the frame;
the first track being pivotally connected to the first stroller-attaching mount, opposite to the rear wheel assembly;
the second track being pivotally connected to the first track, opposite to the first stroller-attaching mount;
the track-securing bracket being fixed to the second track, opposite to the first track;
the track-securing bracket being removably attached to the front wheel assembly, opposite to the frame;
the track adjustment lever being pivotally connected to the first track and the second track at an end thereof, opposite to the first stroller-attaching mount and the track-securing bracket;
the track adjustment lever being slidably and pivotally engaged with the frame;
the first track and the second track having a folded configuration and an unfolded configuration in response to the track adjustment lever slidably and pivotally moving on the frame;
the track-securing bracket being engaged with the front wheel assembly when the first track and the second track being in the unfolded configuration through the track adjustment lever slidably and pivotally moving on the frame with the end away from the frame;

the track-securing bracket being disengaged from the front wheel assembly when the first track and the second track being in the folded configuration through the track adjustment lever slidably and pivotally moving on the frame with the end proximate to the frame;

the first track and the second track each comprising a belt, a proximal wheel, a distal wheel and a wheel mounting bracket;

the proximal wheel and the distal wheel being rotatably connected to the wheel mounting bracket;

the proximal wheel and the distal wheel being positioned opposite to each other along the wheel mounting bracket; and the belt being perimetrically positioned about the proximal wheel, the wheel mounting bracket and the distal wheel.

2. The stroller track system as claimed in claim 1 further comprising;

the wheel mounting bracket being a platform; and the belt being slidably engaged with the platform.

3. The stroller track system as claimed in claim 1 further comprising:

the first track and the second track each further comprising at least one intermediate wheel;

the at least one intermediate wheel being rotatably connected to the wheel mounting bracket;

the at least one intermediate wheel being linearly distributed between the proximal wheel and the distal wheel; and the belt being tangentially positioned about the at least one intermediate wheel.

4. The stroller track system as claimed in claim 1 further comprising:

the left tread assembly and the right tread assembly being motorized to propel the stroller.

5. The stroller track system as claimed in claim 1 further comprising:

the first track and the second track being motorized to transition in-between the folded configuration and the unfolded configuration.

6. The stroller track system as claimed in claim 1 further comprising:

the left tread assembly and the right tread assembly being mounted opposite to each other across the frame.

7. The stroller track system as claimed in claim 1 further comprising:

the stroller further comprising a seat;

the seat being adjustably mounted to the frame; and the orientation of the seat being selectively configured to account for the orientation of the first tread assembly and the second tread assembly.

8. The stroller track system as claimed in claim 1 further comprising:

the left tread assembly and the right tread assembly each further comprising the second track and at least one supplemental track;

the second track being pivotally connected to the first track; and the at least one supplemental track being pivotally connected to the second track, opposite to the first track.

* * * * *